UNITED STATES PATENT OFFICE.

HENRY ELIOT HOWARD AND GEORGE HADLEY, OF HALESOWEN, NEAR BIRMINGHAM, ENGLAND.

TREATMENT OF SPENT ACID FROM GALVANIZING-WORKS.

SPECIFICATION forming part of Letters Patent No. 715,804, dated December 16, 1902.

Application filed August 9, 1902. Serial No. 119,113. (No specimens.)

*To all whom it may concern:*

Be it known that we, HENRY ELIOT HOWARD, manufacturer, and GEORGE HADLEY, chemist, subjects of the King of Great Britain, residing at Coombs Wood Tube Works, Halesowen, near Birmingham, in the county of Worcester, England, have invented a certain new and useful Improvement in the Treatment of Spent Acid from Galvanizing-Works, of which the following is a specification.

This invention relates to the treatment of spent acid from galvanizing-works.

According to this invention the spent hydrochloric acid from galvanizing-works is pumped into a tank. Impure zinc or zinc oxid, which may be the residues from galvanizing-works, is put in and dissolved until the solution is neutral, zinc chlorid ($ZnCl_2$) being formed. The impurities, which consist chiefly of silica and metallic lead, are allowed to settle, and the clear solution of chlorids of iron and zinc is decanted into a second tank. This solution is heated by blowing steam through, and the ferrous chlorid ($FeCl_2$) brought to the ferric state ($Fe_2Cl_6$) by means of milk of bleaching-powder and partly precipitated as ferric hydrate, $Fe_2(OH)_6$. The remaining portion of ferric chlorid is then completely precipitated with a small quantity of milk of lime or other alkali. The precipitated ferric hydrate is then allowed to settle and the clear solution of chlorid of zinc decanted into a third tank. The precipitate of oxid of iron at the bottom of the tank, which is in a state of thick mud, is then forced into a filter-press and thoroughly washed, the clear solution running into the third tank. The zinc in the solution is then precipitated as zinc hydrate $Zn(OH)_2$ with milk of lime or other alkali and allowed to settle. The clear solution of calcium chlorid is then run off into a fourth tank, where it is again used to hydrate the lime for the precipitation of zinc until it is sufficiently concentrated to be evaporated for the manufacture of calcium chlorid. The hydrate of iron is taken from the filter-press and may be dried, burned, and ground and used in the arts for the manufacture of red paints of various shades. The hydrate of zinc may be dried to oxid and used in the manufacture of paint, or it or a portion of it may be distilled for the manufacture of chemically-pure zinc.

What we claim is—

1. The treatment of spent acid from galvanizing-works by adding zinc thereto, treating with bleaching-powder to transform the ferrous salts into ferric salts, then precipitating the iron salts present, separating the solution of zinc salts from the precipitate, and finally precipitating the zinc.

2. The treatment of spent acid from galvanizing-works by adding zinc thereto in separating the solution from the precipitate, treating with bleaching-powder to transform the ferrous salts into ferric salts, then precipitating the iron salts present, separating the solution of zinc salts from the precipitate, and finally precipitating the zinc.

3. The treatment of spent acid from galvanizing-works by adding zinc thereto, treating with bleaching-powder to transform the ferrous salts into ferric salts, then adding alkali to precipitate the iron present as ferric hydrate, separating the solution of zinc salts from the precipitate, and finally precipitating the zinc.

4. The treatment of spent acid from galvanizing-works by adding zinc thereto, treating with bleaching-powder to transform the ferrous salts into ferric salts, then adding alkali to precipitate the iron present as ferric hydrate, and subsequently more alkali for the precipitation of the zinc salts.

5. The treatment of spent acid from galvanizing-works by adding zinc thereto, separating the solution from the precipitate, treating with bleaching-powder to transform the ferrous salts into ferric salts, then adding alkali to precipitate the iron present as ferric hydrate, separating the solution of zinc salts from the precipitate, and finally precipitating the zinc.

6. The treatment of spent acid from galvanizing-works by adding zinc thereto, separating the solution from the precipitate, treating with bleaching-powder to transform the ferrous salts into ferric salts, then adding alkali to precipitate the iron present as ferric hydrate, and subsequently more alkali for the precipitation of the zinc salts.

HENRY ELIOT HOWARD.
GEORGE HADLEY.

Witnesses:
A. MATHEWS,
A. E. OCKFORD.